May 26, 1942.  H. T. KRAFT  2,284,000
METHOD OF MAKING MOLDS
Filed July 31, 1939   2 Sheets-Sheet 1

INVENTOR
Herman T. Kraft
BY Evans + McCoy
ATTORNEYS

May 26, 1942.  H. T. KRAFT  2,284,000
METHOD OF MAKING MOLDS
Filed July 31, 1939  2 Sheets-Sheet 2
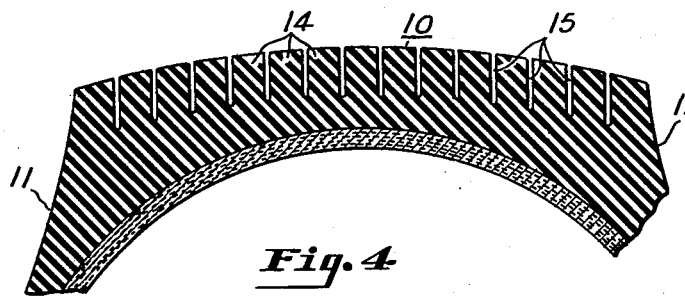
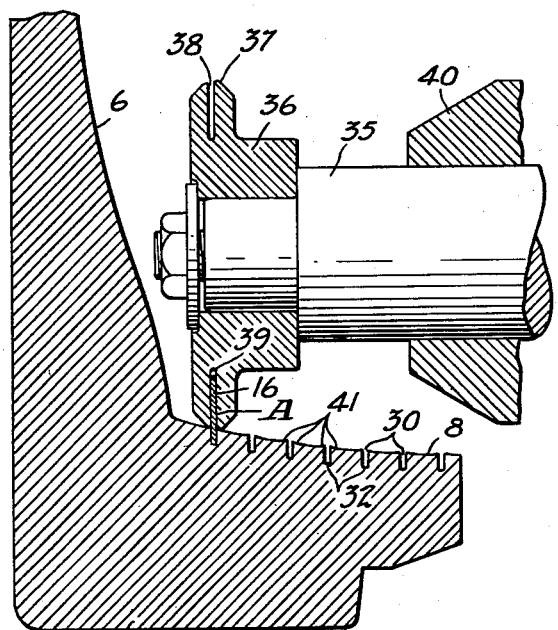
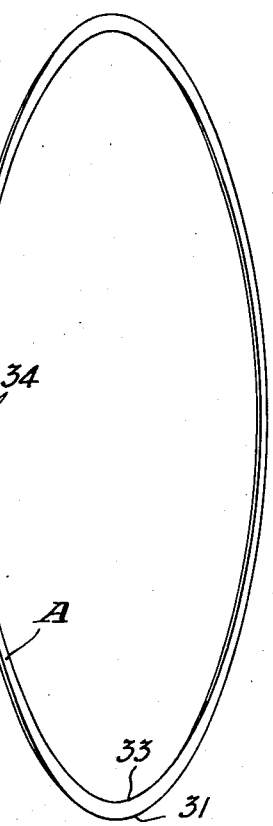
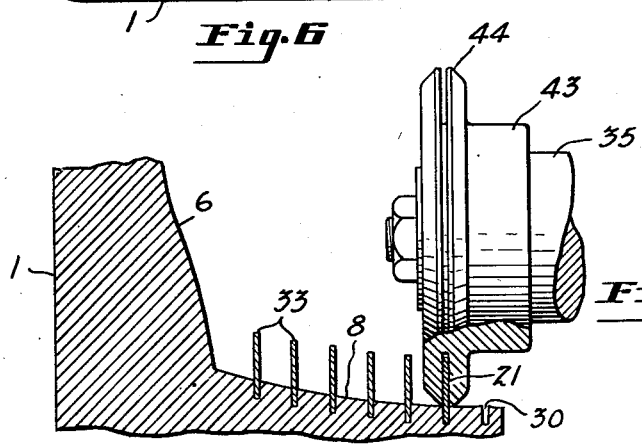
INVENTOR
*Herman T. Kraft*
BY
*Evans + McCoy*
ATTORNEYS Patented May 26, 1942

2,284,000

UNITED STATES PATENT OFFICE 2,284,000

METHOD OF MAKING MOLDS

Herman T. Kraft, Akron, Ohio, assignor to The General Tire & Rubber Company, Akron, Ohio, a corporation of Ohio Application July 31, 1939, Serial No. 287,523

5 Claims. (Cl. 29—148.2)

This invention relates to molding apparatus for rubber articles and more particularly to the method of making the same for use in vulcanizing an annular rubber article, such as the peripheral road engaging tread portion of a vehicle tire.

In the molding of rubber articles having very deep grooves the relatively thin ribs or fins on the mold parts which form the grooves are subject to breakage after a very short period of operation because of the relatively high stresses to which they are subjected during the stripping of the article from the mold. Recent developments in automobile tire design have resulted in treads which employ a multiplicity of relatively narrow circumferentially extending ribs which are separated from one another by deep narrow grooves also circumferential in extent. A mold for forming this type of tread employs a number of circular ribs or fins which form the narrow tread grooves. When such ribs or fins are formed of the material of the mold, which is usually an iron or steel casting, they are frequently broken when a vulcanized tire is stripped from the mold. It is, therefore, an object of the invention to provide a mold in which narrow ribs or fins for forming deep narrow grooves in rubber articles are made of a different and stronger metal or material than the metal of the main or body portion of the mold.

Another object is to provide a mold having a body of one form of metal and a narrow thin rib or fin of another form of metal secured to the body of the mold.

Another object is to provide a tire mold having a face for forming the road engaging tread portion of a tire, which face incorporates a multiplicity of circular bands of steel which project inwardly from the face of the mold. More specifically, the invention aims to provide a tire mold of this character in which each of the circular bands of steel has its outer periphery embedded in the metal of the mold body to be thereby retained in place.

A further object is to provide a rubber mold and a method for making the same, which mold is simple in design and construction and inexpensive to manufacture. Other objects and advantages will become apparent from the following detailed description of a suitable mold embodying the invention and the method of making the same made in connection with the accompanying drawings, in which:

Figure 4 is a fragmentary sectional detail showing the road engaging tread portion of a pneumatic vehicle tire of the type formed by the mold shown illustrated in the previous figures;

Figure 5 is a perspective view showing the form of one of the steel rings used in the construction of the mold illustrated;

Figure 6 is a diagrammatic detail in section and with parts removed showing the manner in which one of the steel rings is secured in the cast metal body of the mold; and Figure 7 is a diagrammatic detail in section and with parts removed similar to Fig. 6 showing the manner in which another of the steel rings is secured in place.

Figure 1:
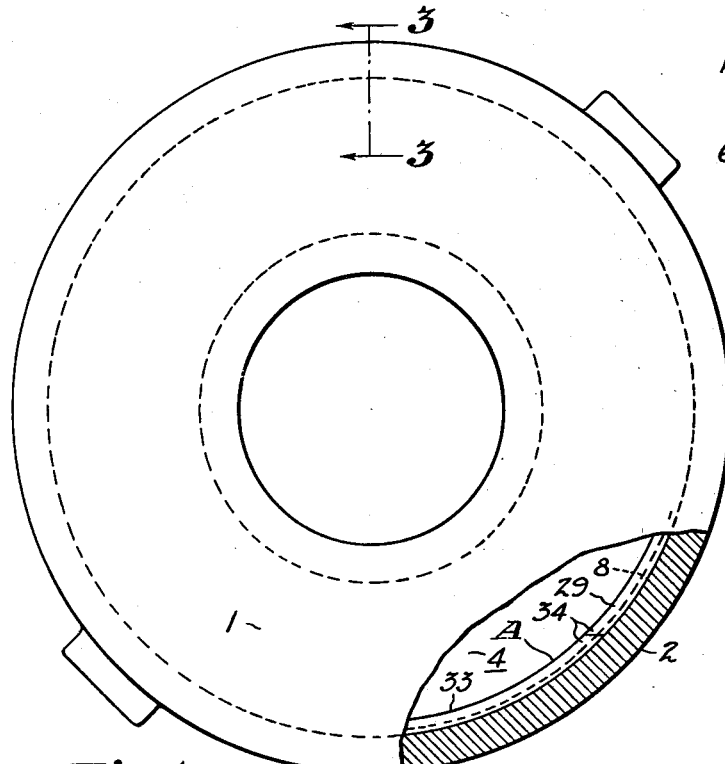
Figure 1 is a view of the mold, partly in section and with parts removed.
Figure 2:
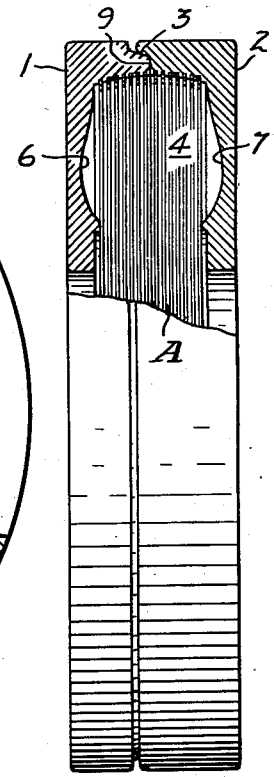
Figure 2 is a side view, partly in section and with parts removed, of the mold shown in Fig. 1.

The mold of the present invention comprises a body portion which is preferably formed of cast metal such as iron or steel. This body may be of any well known construction and, as shown in the drawings, may comprise two mating parts 1 and 2 which have a telescopic joint indicated at 3 for locating the parts relative to one another during the molding operation. Each of the parts 1 and 2 is in the form of a circular annulus of conventional form. Each of the mold parts is internally recessed so that there is provided within the cast metal body of the mold a cavity 4 which receives the object to be molded or cured, which, in the present instance, is a pneumatic vehicle tire such as that shown in Fig. 4. Surfaces 6 and 7 are formed on the mold parts 1 and 2, respectively, and define the annular side walls of the tire or article.

An inwardly directed face 8 is formed in the mold to define the road engaging tread surface of the tire. This face may be formed half in the mold part 1 and half in the mold part 2 so as to be disposed on both sides of parting line 9 of the mold sections. As shown in Fig. 4, tread surface 10 of the tire to be formed is preferably arched or curved from side wall 11, formed by mold surface 6, to side wall 12, formed by surface 7. Therefore, the tread defining face 8 of the mold is also curved or arched between the surfaces 6 and 7.

The tread of the tire to be vulcanized in the mold of the present invention comprises a multiplicity of ribs 14 which are relatively thin and narrow and extend circumferentially about the periphery of the tread, this type of tire being originally and more fully disclosed in my prior U. S. Patent No. 2,048,635. The ribs are separated from one another by deep narrow circumferential grooves 15. It is preferable that the grooves 15 be formed during the molding operation. If, however, ribs or fins to define the grooves 15 are formed in the mold parts 1 and 2 by a method such as casting or machining, the ribs or fins are integral with the cast metal of the body of the mold. Such integral ribs or fins are generally of insufficient strength to repeatedly withstand the severe stresses to which they are subjected when the cured or vulcanized tire is stripped from the mold. That is to say, the composition and crystal structure of the cast metal of which the body of the mold consists is not of the character or type which will have enough strength, when reduced to the very thin sections required to form the narrow grooves 15, to resist the forces exerted laterally against the ribs when a vulcanized tire is withdrawn from the mold cavity 4.

Figure 3:
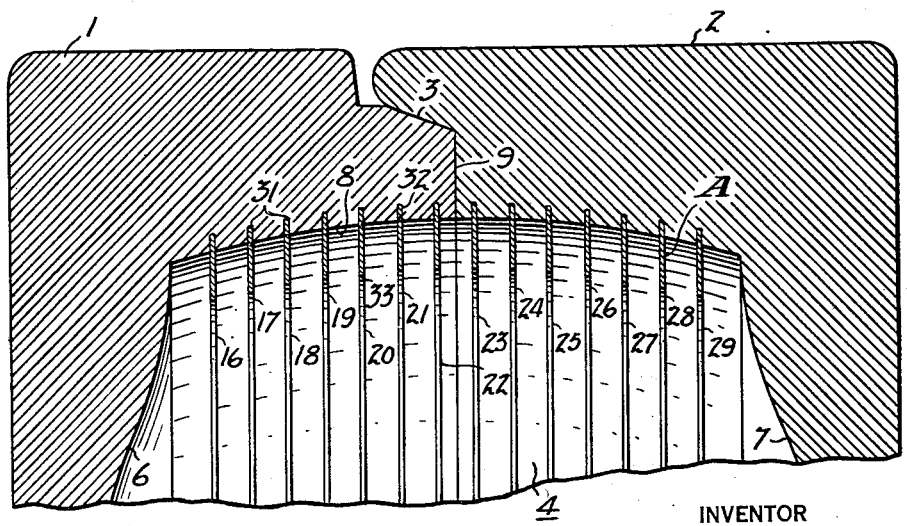
Figure 3 is a fragmentary sectional detail of the mold shown in Fig. 1 taken substantially on the line 3—3 of that figure and enlarged with respect thereto.

Therefore, in order to provide a mold which will permit the molding of relatively deep circumferential or annular grooves in a tread of a tire, the present invention contemplates the combination of an annular band or bands of a metal having great strength, even when reduced to a thin section, for forming the groove defining ribs of the mold, with a cast metal of conventional character for forming the body of the mold. In the embodiment of the invention illustrated a multiplicity of thin flat annular bands A of resilient steel are secured by their outer marginal edges to the inwardly directed face 8 of the mold body. In the present case fourteen of the steel bands A are employed, being numbered from 16 to 29, inclusive. (Fig. 3).

Any suitable method or means for securing the bands A to the face 8 of the mold may be employed; such, for example, as welding or the like. Or the bands may be rolled in a steel plate and the steel plate secured to the face of the mold. As illustrated, a preferred method is to attach the annular steel bands by embedding the outer peripheries thereof in grooves 30 formed in the face 8. The grooves 30 are preferably of circumferential extent and of sufficient depth so that when outer periphery edges 31 of the ribs are seated in bottoms 32 of the grooves, as shown in Fig. 3, the inner peripheries 33 of the rings project inwardly from the face 8 sufficient distances to form the tire tread grooves 15 to the proper or desired depth.

One suitable material from which the bands A may be formed is relatively high-carbon spring steel such, for example, as the well known kind used in band saw blades. This material is very strong and resilient and effectively withstands lateral thrusts or stresses without fracture. In placing the bands A in the grooves 30, strips of the proper length are provided and their ends 34 beveled as a suitable angle such as 45° to form a joint, as will be later described.

The bands A are preferably placed or secured in the grooves 30 one at a time. This operation may be performed by means of an apparatus such as that shown in Fig. 6. This apparatus comprises a driven shaft 35 on which is mounted a pressure wheel 36 having a relatively narrow peripheral face 37 formed to the same contour as a portion of the mold face 8 adjacent one of the grooves 30. In the face 37 of the wheel is formed an annular groove 38 of less depth than the width of the band to be forced into one of the grooves 30 thereby. The combined depth of the wheel groove 38 and the groove 30 in the mold is slightly greater than the width of the band so that a slight clearance 39 is present between the band A and the bottom of the wheel groove 38 to prevent pressure on the edge of the band.

To fit and secure one of the bands A in place it is cut to length or approximately so and bent or deformed edgewise into the shape of a circular annulus or ring, as shown in Fig. 5. The ends 34 are beveled at about 45 degrees, as shown, and the ring is then placed in the groove 30 for which it is intended. One of the ends 34 is trimmed, if necessary, to fit the ring or band accurately in the groove around the entire periphery thereof and the ends are secured together by a suitable connecting or adhering agent such as silver solder or the like. The pressure wheel 36 is then applied over the exposed portion of the band so that the periphery of the wheel straddles the band to prevent buckling thereof while the surface 37 of the wheel seats against the mold face 8 on opposite sides of one of the grooves 30. A suitable support (not shown) is provided for the mold part in which the rings are being secured and pressure is applied to the wheel 36 by means of journal 40 therefor, or otherwise, as desired, so that the periphery 37 exerts sufficient pressure on portions of the mold face 8 adjacent the groove 30 to cause the metal therearound to be forced against the opposite sides of the outer marginal portion of the band A. In this manner the ring is securely held in the mold by its outer peripheral margin. As the wheel 36 progresses over the inner face 8 of the mold, the band A is held in the groove 30 of the mold face and at the same time the cast metal of the mold body is caused to grip the steel band, so that after the passage of the wheel 36 the band is retained in place.

While the combined depths of the groove 30 in the mold face 8 and the groove 38 in the wheel 36 is slightly greater than the width of the band A to prevent edgewise pressure on the band and consequent buckling of the band, the clearance 39 is so slight that the bottom of the groove 38 retains the band in the groove 30 substantially to the full depth thereof during the passage of the wheel 36, thus insuring that the amount of the band projecting from the groove 30 is substantially uniform around the entire periphery of the mold.

In the machining or finishing of the mold parts 1 and 2 prior to the application of the rings A, it is preferable that the portions of the face 8 adjacent each of the grooves 30 be provided with slightly raised formations 41. These formations may comprise ridges which extend along the mold face 8 adjacent and on both sides of each of the grooves 30. Accordingly, during the rotation and relative progression of the wheel 36 circumferentially over the inwardly directed face 8 of the mold, the pressure of the wheel is concentrated along the raised portions 41 so that these portions are thoroughly deformed or collapsed to press the cast metal of the mold part against the steel band A and effect a seal therewith. This seal prevents the flow of rubber into the groove 30 during the molding of a tire.

By reference to Fig. 4 it may be seen that all of the tire tread grooves 15 are disposed in parallel relation to one another so that the bands A to form such grooves must be placed in the mold in parallel relation to one another. Since, as previously mentioned, the inwardly directed face 8 of the mold may have a curved contour, the wheel 36 employed to force one of the outer bands such as 16 or 29 into place, may not have a peripheral surface of the right contour to engage the portions of the face 8 adjacent the grooves 30 which receive the central bands, such as bands 21 through 24. It is, therefore, contemplated to provide enough of the wheels 36 so that the peripheral faces thereof may accurately conform to the desired contour of the different parts of the face 8 of the mold. Thus, for the rib 21 there is provided a wheel 43 which has a peripheral surface 44 more nearly cylindrical than the peripheral surface 37 of the wheel 36 shown in Fig. 6. Accordingly, each of the bands A is individually pressed into place by a pressure wheel which accurately fits the portions of the face 8 adjacent the groove 30 which receives the band, so that the face 8 is, in effect, deformed during the pressing or band-inserting operation to the desired contour for the ribs which are to be formed on tires cured in the mold. By thus individually applying each of the bands A, the pressure used to deform the metal of the mold to cause the same to grip the band may be more accurately controlled and a complete attachment of the entire periphery of each band is definitely assured.

The principles of the present invention may be utilized in numerous constructions, changes being made in the particular details shown and described as desired, it being understood that various modifications and alterations are contemplated and that the embodiments shown are given for purposes of explanation and illustration.

What I claim is:

1. The method of providing a substantially annular circumferentially extending thin fin on the tread curing portion of a metal tire mold which comprises forming a thin flat strip of resilient metal to approximately ring shape, connecting the ends of the bent strip, and securing one edge of the strip to said mold portion by roll pressing.

2. The method of providing a thin circular fin on the tread curing portion of a tire mold which comprises forming a thin flat strip of resilient metal to ring shape, silver soldering the ends of the strip to secure the same together and form an annulus, and securing the outer edge only of the bent strip annulus to said mold portion.

3. The method of providing a substantially annular circumferentially extending thin fin on the tread curing portion of a metal tire mold which comprises forming a narrow groove in said mold portion, forming a thin flat strip of resilient metal to approximately ring shape, placing one edge of the strip in said groove, and mechanically deforming the metal of the mold progressively along the length of the strip and at the sides of the groove to grip the strip edge.

4. The method of providing a substantially annular circumferentially extending thin fin on the tread curing portion of a metal tire mold which comprises forming a narrow groove in said mold portion, placing one edge of a thin strip of resilient metal in the groove, and roll pressing the metal of the mold simultaneously along both sides of the groove to deform the same to grip the strip edge.

5. The method of providing a thin fin on the tread curing portion of a metal tire mold which comprises forming a narrow groove in said mold portion, placing one edge of an elongated thin strip of resilient metal in the groove, and mechanically deforming the metal of the mold progressively along the length of the groove to grip the strip edge while supporting the sides of the portion of the strip that extends out of the groove.

HERMAN T. KRAFT.